United States Patent
Unno et al.

[11] Patent Number: 5,643,842
[45] Date of Patent: Jul. 1, 1997

[54] LOW-FRICTION CERAMICS

[75] Inventors: Yasuaki Unno, Yamato; Hideo Yamamuro, Kawasaki; Hideki Kita, Fujisawa, all of Japan

[73] Assignee: Isuzu Ceramics Research Institute Co., Ltd., Kanagawa-ken, Japan

[21] Appl. No.: 510,873

[22] Filed: Aug. 3, 1995

Related U.S. Application Data

[63] Continuation of Ser. No. 135,350, Oct. 13, 1993, abandoned.

[30] Foreign Application Priority Data

Oct. 14, 1992 [JP] Japan .................. 4-300642

[51] Int. Cl.$^6$ ............ C04B 35/565; C04B 35/584; C04B 35/597; C04B 35/599
[52] U.S. Cl. ............ 501/88; 501/92; 501/97.2; 501/98.1
[58] Field of Search ................ 501/97, 98, 88, 501/92

[56] References Cited

U.S. PATENT DOCUMENTS

| | | | |
|---|---|---|---|
| 4,332,909 | 6/1982 | Nishida et al. | 501/92 |
| 4,499,193 | 2/1985 | Phelps et al. | 501/88 |
| 4,569,921 | 2/1986 | Omori et al. | 501/88 |
| 5,023,214 | 6/1991 | Matsumoto et al. | 501/97 |
| 5,079,198 | 1/1992 | Edler et al. | 501/97 |
| 5,094,986 | 3/1992 | Matsumoto et al. | 501/97 |
| 5,204,294 | 4/1993 | Matsumoto | 501/92 |
| 5,213,729 | 5/1993 | Edler et al. | 501/97 |
| 5,234,643 | 8/1993 | Matsumoto et al. | 264/65 |
| 5,294,575 | 3/1994 | Matsumoto | 501/97 |
| 5,389,588 | 2/1995 | Lukacs et al. | 501/96 |

FOREIGN PATENT DOCUMENTS

| | | | |
|---|---|---|---|
| 0392381 | 10/1990 | European Pat. Off. | |
| 0479214 | 4/1992 | European Pat. Off. | |
| 0033511 | 3/1979 | Japan | 501/97 |
| 58-64268 | 4/1983 | Japan | |
| 0064269 | 4/1983 | Japan | 501/97 |
| 0064270 | 4/1983 | Japan | 501/97 |
| 0064272 | 4/1983 | Japan | 501/97 |
| 59-88374 | 1/1984 | Japan | |
| 59-30769 | 2/1984 | Japan | |
| 61-72685 | 4/1986 | Japan | |
| 1525610 | 9/1978 | United Kingdom | 501/98 |

*Primary Examiner*—Mark L. Bell
*Assistant Examiner*—David Sample
*Attorney, Agent, or Firm*—Browdy and Neimark

[57] ABSTRACT

The present invention provides a low-friction ceramic having a lowered coefficient of friction and an enhanced strength. The ceramic comprises as the matrix phase a nonoxide ceramic containing silicon, such as $Si_3N_4$ or SiC and an iron compound in an amount of about 5 to 40% by weight dispersed in the matrix phase. This ceramic is excellent in the ability to adsorb lubricating oil, has a low coefficient of friction, is almost free from pores, and has a strength equal to or higher than that of a ceramic containing no iron oxide.

7 Claims, 4 Drawing Sheets

1 μm

1 μm

10 μm

LOW-FRICTION CERAMICS

This application is a continuation of application Ser. No. 08/135,350, filed Oct. 13, 1993 now abandoned.

BACKGROUND OF THE INVENTION

1. Field of the Invention

The present invention relates to a low-friction ceramic which comprises a matrix phase of a nonoxide ceramic containing silicon.

2. Description of the Prior Art

A method of decreasing the coefficient of friction of ceramics by dispersing silicon carbide (SIC) and boron nitride (BN) in silicon nitride ($Si_3N_4$) is disclosed, for example, in Japanese Patent Laid-Open No. 30769/1984. $Si_3N_4$ containing an iron oxide such as $Fe_3O_4$ as the sintering aid is disclosed, for example, in Japanese Patent Laid-Open Nos. 64268/1983, 88374/1984 [GB No. 8228174 (application date: Oct. 1, 1982)] and 72685/1986 [U.S Ser. No. 631269 (application date: Jul. 16, 1984)].

The Japanese Patent Laid-Open No. 30769/1984 discloses a silicon nitride sinter having a low coefficient of friction. For the purpose of improving the slipperiness at elevated temperatures of said sinter, a filler is dispersed as a solid lubricant in the matrix of the sinter, said filler containing at least one member selected from among carbon, BN and SiC containing free carbon.

The Japanese Patent Laid-Open No. 64268/1983 discloses a silicon nitride sinter and a process for producing the same. Said sinter is prepared by sintering in a nonoxidative atmosphere a powdery mixture comprising 1 to 20% by weight of the powder of at least one oxide selected from among $Fe_2O_3$, CaO, $TiO_2$, MgO, $Al_2O_3$, BeO, NiO, $Cr_2O_3$, $ZrO_2$, $Y_2O_3$, $CoO_2$ and $SiO_2$, 5 to 40% by weight of the powder of at least one silicide selected from among those of metals including Ca, Ti, Zr, Nb, Ta, Cr, Mo, W, Fe, Co, Ni and Y, and the balance comprising $Si_3N_4$ powder.

The Japanese Laid-Open No. 88374/1984 discloses a process for producing a silicon nitride ceramic. Said ceramic is prepared by sintering the compact comprising $Si_3N_4$ and at least one oxide sintering aid selected from the group consisting of the oxides of metals including Mg, Y, Cr, Mo, Fe, Mn, W, Co, V, U, Ni, Ti, Hf, Zr, Nb and Ta.

The Japanese Patent Laid-Open No. 72685/1986 discloses a corrosion-resistant silicon nitride body. Said body comprises about 3 to 18% by weight of lanthanum oxide, about 0.5 to 5% by weight of aluminum oxide, about 2% by weight of Fe, about 0.2 to 5% by weight of C, Ca, Al or an oxide thereof and the balance comprising $Si_3N_4$, and has a relatively high corrosion-resistance against phosphoric acid.

A silicon nitride ceramic is required to have a low coefficient of friction when used as an engine part. In general, $Si_3N_4$ containing SiC, BN or an oxide each dispersed therein is poor in the reactivity in the bonding interface and is deteriorated in its own strength, thus causing unfavorable results. The $Si_3N_4$ containing an iron oxide such as $Fe_3O_4$, as the sintering aid as disclosed in each of the above patent documents is poor in the amount of oxide and cannot attain the characteristic of low friction.

SUMMARY OF THE INVENTION

It is an object of the present invention to solve the aforestated problems to thereby provide a low-friction ceramic which has a low coefficient of friction and a high strength by adding an iron oxide such as FeO, $Fe_2O_3$ or $Fe_3O_4$ in a given amount in the matrix phase of a nonoxide ceramic containing silicon to disperse the iron compound in said phase to thereby improve the ability to absorb oils for the purpose of lowering the coefficient of friction of nonoxide ceramic containing silicon, such as SiC, $Si_3N_4$, a composite material of SiC and $Si_3N_4$, sialon (Si—Al—O—N) or Si—O—N.

It is another object of the present invention to provide a low-friction ceramic which comprises a nonoxide ceramic containing silicon as the matrix phase and an iron compound dispersed in said matrix phase. Examples of the nonoxide ceramic containing silicon include SiC, $Si_3N_4$, a composite material of SiC and $Si_3N_4$, sialon Si—Al—O—N and Si—O—N.

Preferable examples among them include $Si_3N_4$, SiC and a composite material of SiC and $Si_3N_4$.

The low-friction ceramic contains the above-mentioned iron compound having a size of 5 μm or smaller in an amount of 5 to 40% by weight in terms of FeO, $Fe_2O_3$ or $Fe_3O_4$.

The low-friction ceramic can be obtained by adding an iron oxide such as FeO, $Fe_2O_3$ or $Fe_3O_4$ as the additive in a given amount, specifically 5 to 40% by weight in the matrix phase of $Si_3N_4$ to improve the ability to adsorb oils, thus providing a composite material of $Si_3N_4$ and an iron compound maintaining a low coefficient of friction and a high strength.

The low-friction ceramic comprises the nonoxide ceramic containing silicon as the matrix phase and an iron compound dispersed in said phase and therefore it is characterized in that it has a coefficient of friction lower than that of the conventional $Si_3N_4$, has scarcely any pores, has a strength equal to or higher than that of the ceramic not containing any iron compound in spite of its low coefficient of friction, and thus maintains a strength enough to be usable as engine parts, etc.

DETAILED DESCRIPTION OF THE EMBODIMENT

Now the examples of the low-friction ceramic according to the present invention will be described with reference to the attached drawings. The low-friction ceramic according to the present invention is a nonoxide ceramic containing silicon to which is imparted a low-coefficient of friction without deteriorating the strength and comprises the above-mentioned nonoxide ceramic as the matrix phase and an iron compound dispersed therein. Examples of the nonoxide ceramic containing silicon include SiC, $Si_3N_4$, a composite material of SiC and $Si_3N_4$, sialon Si—Al—O—N and Si—O—N. Preferable examples among them include SiC and $Si_3N_4$. The size of the iron compound is preferably 5 μm or smaller. The content of the iron compound in the ceramic is preferably 5 to 40% by weight in terms of FeO, $Fe_2O_3$ or $Fe_3O_4$ so as not to appreciably decrease the strength of the ceramic.

The low-friction ceramic according to the present invention can be produced in the following way.

In Example 1, the low-friction ceramic according to the present invention was produced through the following steps. At first, $Si_3N_4$, $Al_2O_3$ and $Y_2O_3$ were blended in the proportion of 90:5:5, to which were added three iron compounds, FeO, $Fe_2O_3$ and $Fe_3O_4$, each in a given amount and further distilled water and a binder, followed by mixing in a ball mill for about 24 hours. The resultant mixture was granulated with a spray dryer to produce various granular products by varying the loading of the iron compounds.

Then, the products thus granulated were preformed in a mold having inside dimensions of 25×20×100 mm and the resultant preforms were made into various moldings in the form of rectangular parallelopiped by CIP under the pressure of about 2000 kgf/cm². The resultant moldings were degreased and then fired by heating to the maximum temperature of 1850° C. in a nitrogen atmosphere at 9.3 MPa to produce various dense sinters.

The sinters produced through the above-mentioned steps were machined and polished into test pieces in the form of rectangular parallelopiped with dimensions of 16×10×70 mm to carry out sliding test. As the mating members, that is, the mating sliding test pieces for performing the sliding test of the sinters, $Si_3N_4$ sinters having a relative density of 99% or more were produced and made into pins having spherical surfaces with 9 mm radius of curvature at the end surfaces thereof.

Figure 1:
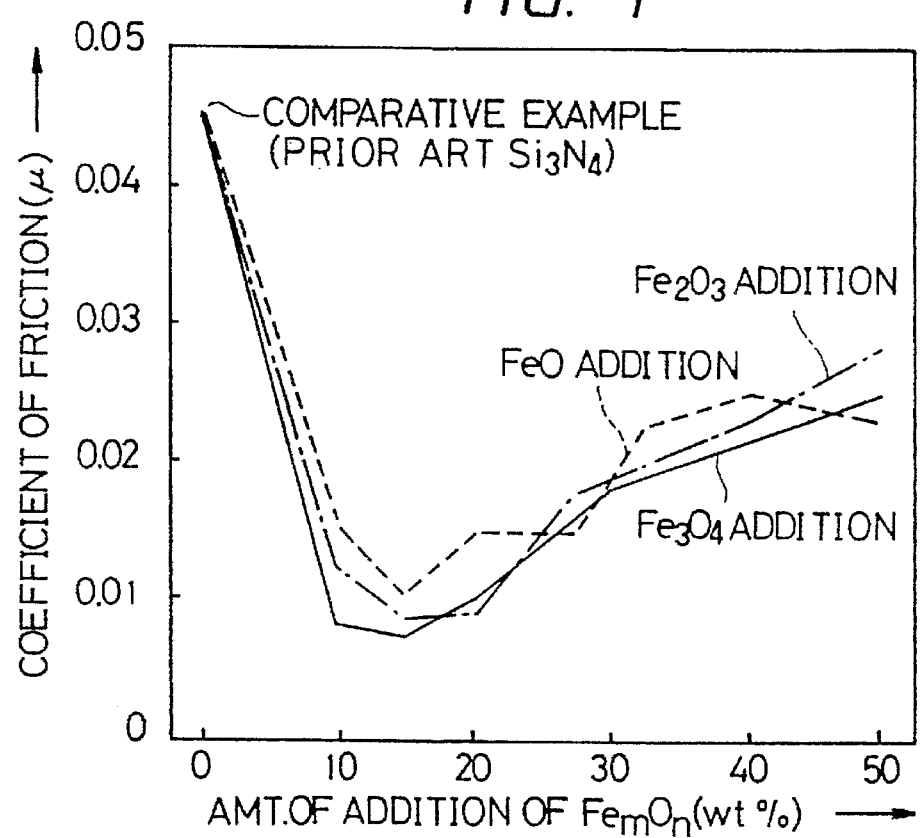
FIG. 1 is a graph showing the coefficient of friction vs. the loading of the iron oxide for the low-friction ceramic according to the present invention.

One of the pins as the mating sliding test piece was set almost perpendicular to one surface of the rectangular-parallelopiped sliding test piece, and the coefficient of friction between the test pieces was measured under the sliding test conditions including the load of 1.0 kgf, the temperature of 150° C., and the sliding velocity of 1.0 m/sec, while a synthetic oil excellent in heat resistance was used as the lubricating oil. FIG. 1 gives the test results in which various iron compounds, $Fe_mO_n$ (FeO, $Fe_2O_3$ and $Fe_3O_4$), were added to $Si_3N_4$ in various amounts. As can be seen from FIG. 1, an amount of $Fe_mO_n$ added to $Si_3N_4$ in the range of 10 to 20% by weight results in the coefficient of friction, μ, as low as about 0.01, whereas an amount thereof exceeding 20% by weight tends to increase the coefficient of friction to some extent. The measurement was made of the contact angle of a dense sinter selected from the sinters against the lubricating oil. As a result, it was confirmed that the composite material of $Fe_mO_n$ and $Si_3N_4$ had a small contact angle and thus was excellent in adsorptivity. In addition, the composite having a larger amount of the iron oxide (40% by weight or more) added thereto left pores to remain according to the results of observation of its texture presumably because of the increased coefficient of friction by the interlock with the mating during sliding. In FIG. 1, zero $Fe_mO_n$ loading refers to the conventional $Si_3N_4$ as a comparative example.

Figure 6:
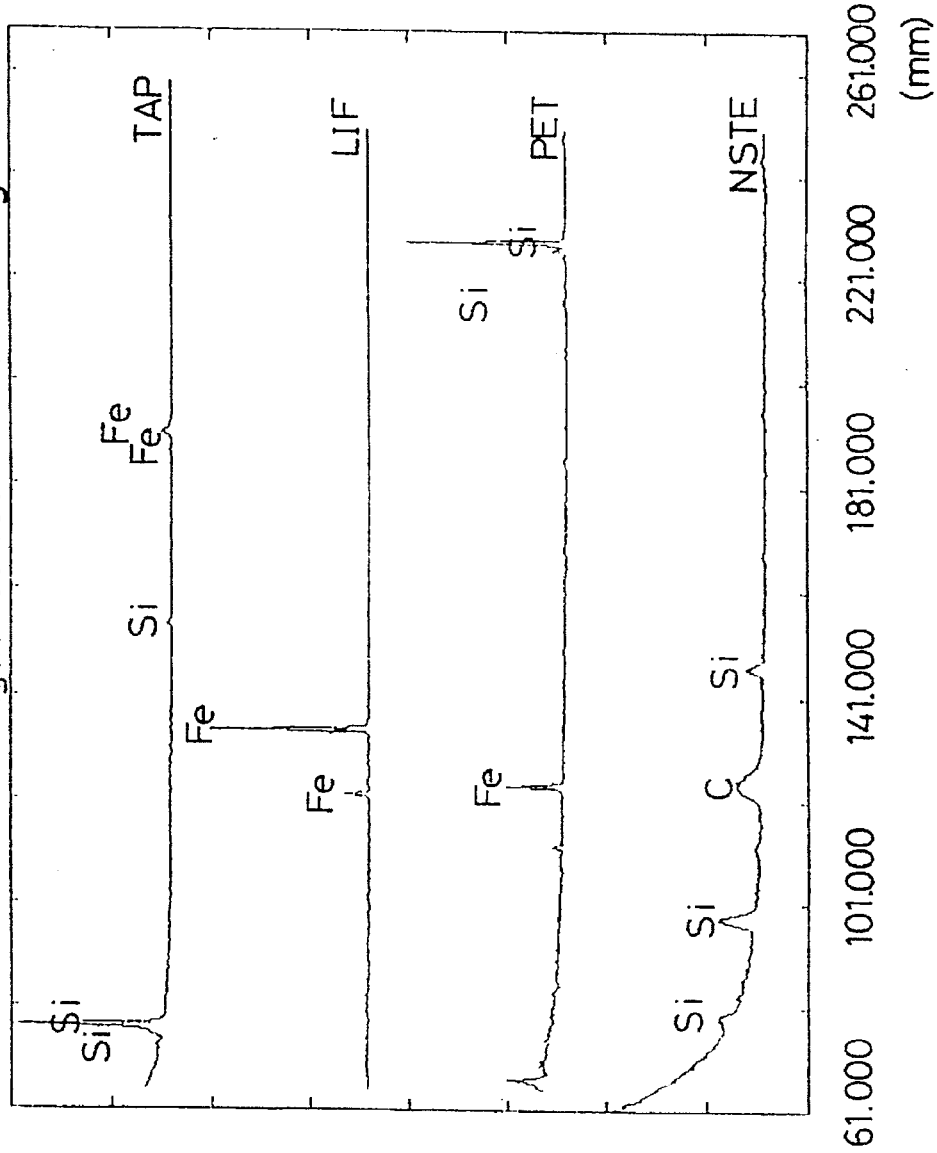
FIG. 6 is a graph showing the X-ray micro qualitative analysis results of a sliding test piece of the low-friction ceramic according to the present invention.

Subsequently, the identification of the phase present in $Si_3N_4$ was made by X-ray micro qualitative analysis for the iron oxide loading of 10% and 20%, respectively. As the result, the phase proved to be composed of an iron-silicon compound as shown in FIG. 6. It is presumable that the compound is excellent in the ability to adsorb lubricating oil.

Figure 2:
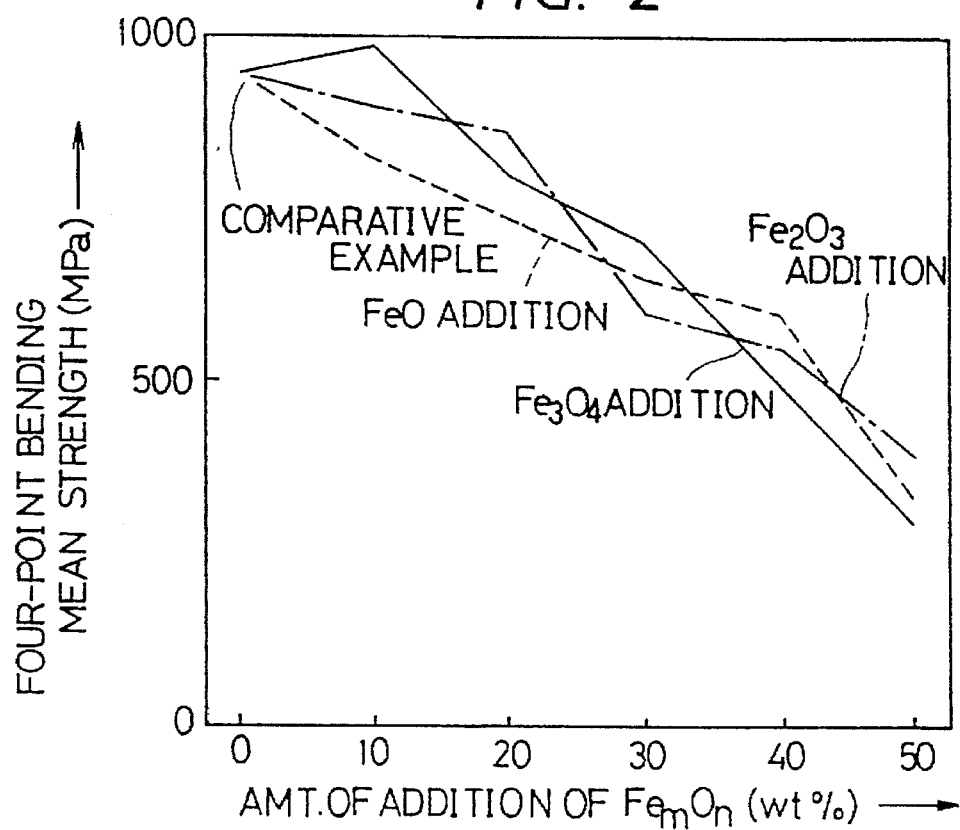
FIG. 2 is a graph showing the average four-point flexural strength vs. the loading of the iron oxide for the low-friction ceramic according to the present invention.

The rectangular parallelopiped sliding test pieces produced in the aforesaid manner were machined to prepare test pieces for the 4-point flexural test to thereby measure the flexural strength. The results are given in FIG. 2, from which it can be seen that the strength decreases with an increase in the amount of $Fe_mO_n$ added. It has been proved by the 4-point flexural test that the $Si_3N_4$ containing 10 to 20% by weight of $Fe_mO_n$ has a strength equal to or higher than that of the $Si_3N_4$ containing no $Fe_mO_n$. In FIG. 2, zero $Fe_mO_n$ loading refers to the conventional $Si_3N_4$ as a comparative example.

Figure 4:
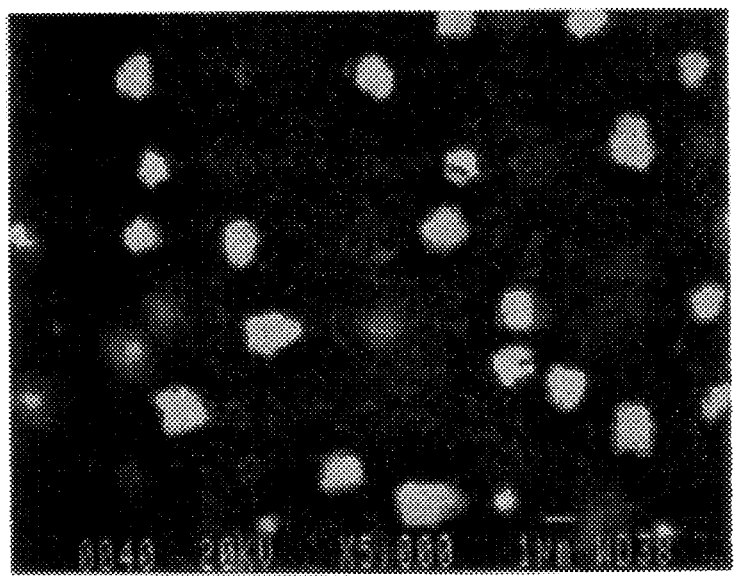
FIG. 4 is an enlarged view by 5000× magnification of the structure of a sliding test piece of the low-friction ceramic according to the present invention by SEM (scanning electron microscopy).
Figure 5:
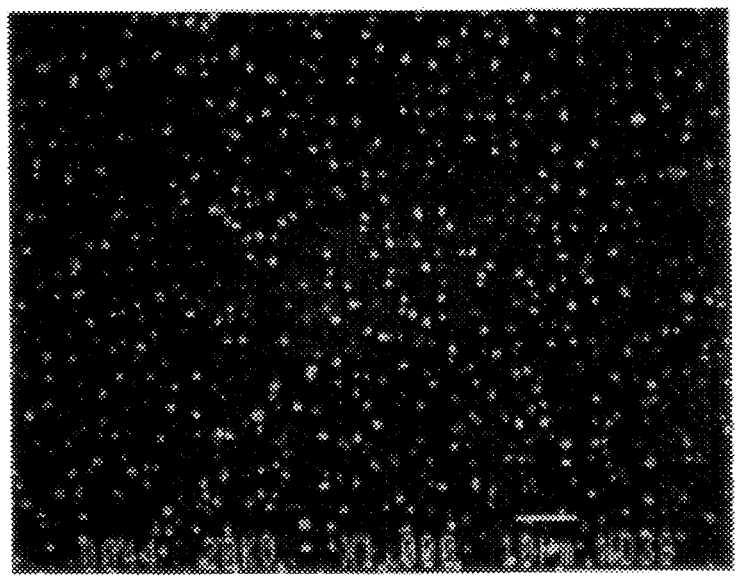
FIG. 5 is an enlarged view by 1000× magnification of the structure of a sliding test piece of the low-friction ceramic according to the present invention by SEM.

The texture of each of the sliding test pieces having 10 to 20% by weight of $Fe_mO_n$ added thereto was observed by SEM. FIG. 4 with 5000× magnification and FIG. 5 with 1000× magnification show the structure of the sliding test pieces having 10% $Fe_mO_n$ added thereto. The white parts in the figures indicate the presence of an iron-silicon compound. It has been proved that in the sliding test pieces having 10% by weight of $Fe_mO_n$, the iron-containing portion does not form solid solution but exists in a dispersed state. It has also been proved that in the texture of the sliding test pieces, scarcely any pores are observed, the growth of crystal grains is suppressed by the iron compound and fine crystal grains remain uniformized. Such a texture is believed to be advantageous for enhancing the strength taking Griffith's formula into consideration.

The sliding test pieces containing more than 10% by weight of $Fe_mO_n$ is decreased in strength. As the result of the observation of the texture in the same manner, the aggregation of $Fe_mO_n$ was recognized and pores were present in the site of aggregation. It is conceivable that the decrease in the strength of the sliding test piece has been due to the pores existing therein and causing the starting point of fracture.

Figure 3:
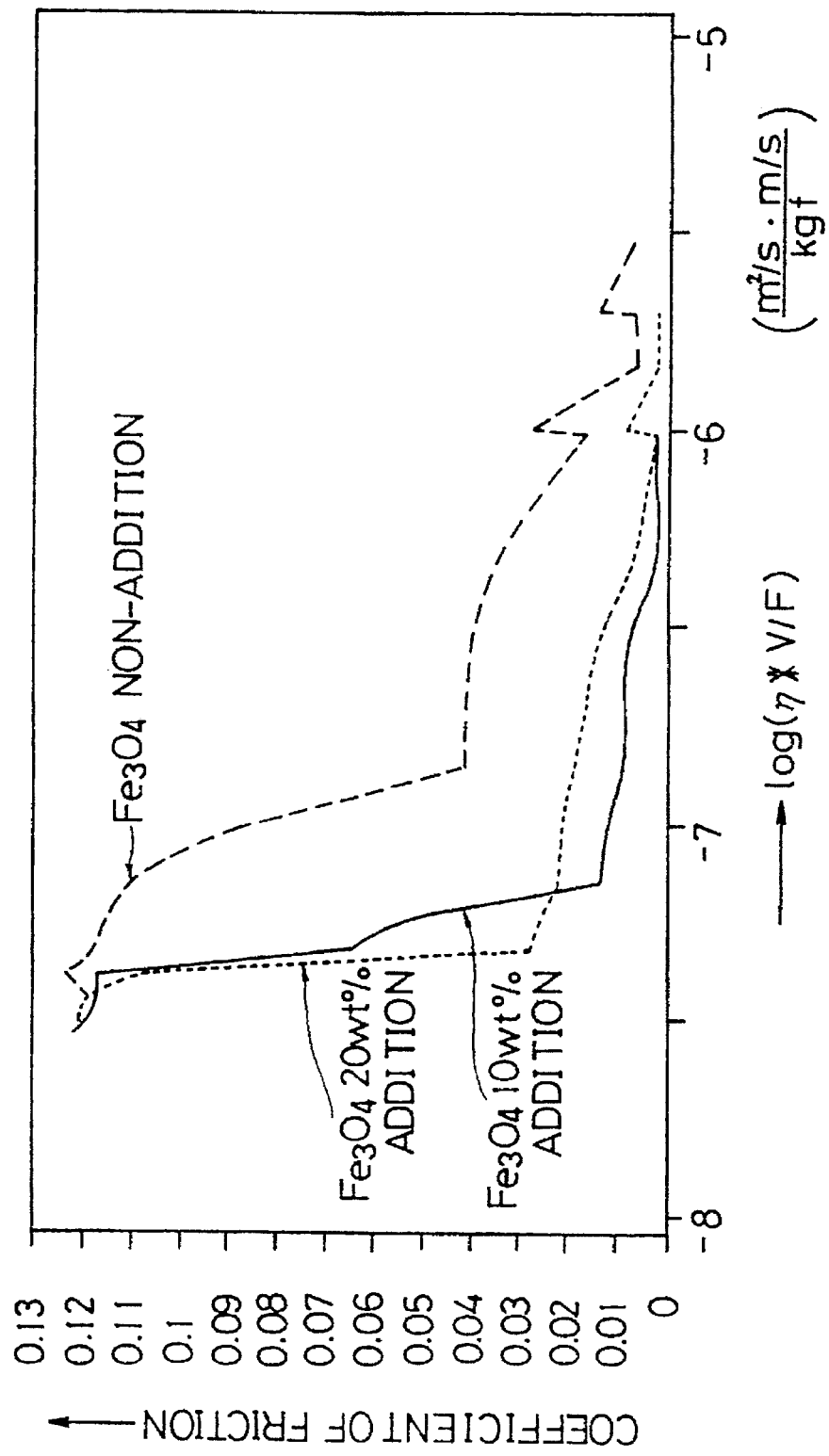
FIG. 3 is a graph showing the relationship between the coefficient of friction and the parameter including the load, velocity and viscosity of lubricating oil with respect to the loading of the iron oxide for the low-friction ceramic according to the present invention.

By plotting parameters including the load and velocity of the sliding test piece and the viscosity of the lubricating oil as the abscissa, the coefficients of friction were measured under various conditions. The results are given in FIG. 3, in which the parameter P is represented by the formula P=log (η×V/F) in the unit of [(m²/S)·(m/S)/kgf], wherein η is the viscosity of the lubricating oil, V is the velocity and F is the coefficient of friction. As can be seen from FIG. 3, the test pieces containing $Fe_mO_n$ are effective in decreasing the friction in the mixed lubricating region as compared with $Si_3N_4$ containing no $Fe_mO_n$.

Next, another example of the low-friction ceramic according to the present invention will be described by referring to Example 2. In Example 2, SiC powder, boron as the sintering aid and $Fe_3O_4$ were blended in given proportions to prepare a low-friction ceramic. The blend was mixed with twice as much distilled water in the same manner as that of Example 1 to prepare a mixture, which was granulated with a spray dryer to produce a granular product. In the same manner as that of Example 1, the product was sintered and used to produce test pieces. Measurements were made of the slipperiness and strength of each test piece with the results described hereunder.

The test pieces having 10% and 20% by weight of $Fe_3O_4$ had a coefficient of friction (μ) of 0.015 and 0.024, respectively, and a strength of 478 MPa and 490 MPa, respectively. The test piece having the increased amount of $Fe_3O_4$ of 30% by weight had the coefficient of friction ($\mu$) of 0.033 and the strength of 463 MPa.

On the contrary, the one containing no $Fe_3O_4$ had the coefficient of friction of 0.039 and the strength of 560 MPa.

As described above, the low-friction ceramic produced in Example 2 was somewhat inferior to that produced in Example 1 with respect to the strength, but exhibited the composite effect of the iron oxide.

Next, for the purpose of comparing the low-friction ceramic according to the present invention with the conventional ceramic, comparative test pieces of $Si_3N_4$ containing BN in place of the iron oxide were produced in the same manner as that of Example 1 as Comparative Example 1. The measurement was made of the slipperiness and strength of the comparative test pieces with the results described hereunder. For the same purpose, comparative test pieces of $Si_3N_4$ containing SiC in place of the iron oxide were produced in the same manner as that of Example 1 as Comparative Example 2. The measurement was made of the slipperiness and strength of the comparative test pieces with the results described hereunder.

In Comparative Example 1, the coefficients of friction ($\mu$) were 0.018, 0,026 and 0.032, respectively, and the strengths were 560, 420 and 116 MPa, respectively, for the addition of BN in amounts of 10, 15 and 20% by weight, respectively.

In Comparative Example 2, the coefficients of friction ($\mu$) were 0.025, 0.033 and 0.046, respectively, and the strengths were 768, 645 and 472 MPa, respectively, for the addition of SiC in amounts of 10, 15 and 20% by weight, respectively.

It has been proved, therefore, that the comparative test piece of $Si_3N_4$ containing BN and that containing SiC are markedly deteriorated in strength and lessened in the effect of decreasing the coefficient of friction ($\mu$) as compared with the low-friction ceramic according to the present invention.

What is claimed is:

1. A low-friction ceramic, consisting essentially of: at least one member selected from the group consisting of silicon nitride, silicon carbide, a composite material of silicon nitride and silicon carbide, a Si—Al—O—N, and Si—O—N as a matrix phase; and at least one compound containing iron and silicon dispersed in said matrix phase and having a particle size of 5 μm or smaller, said at least one compound being contained inside low-friction ceramic in an amount of 5 to 40% by weight of iron oxides initially added as a starting material and being formed through conversion by firing of said iron oxide, and wherein said low-friction ceramic is substantially pore-free.

2. The low-friction ceramic according to claim 1, wherein said at least one member is selected from the group consisting of Si—Al—O—N and Si—O—N as a matrix phase.

3. The low-friction ceramic according to claim 2, wherein said at least one member is Si—Al—O—N.

4. The low-friction ceramic according to claim 3, wherein said at least one member is Si—O—N.

5. The low-friction ceramic according to claim 1, wherein said at least one compound containing iron and silicon is contained in the low-friction ceramic in an amount of about 10 to 20% by weight of iron oxides initially added as starting material.

6. The low-friction ceramic according to claim 1, wherein said low-friction ceramic has a coefficient of friction in the range of about 0.01 to 0.025μ.

7. The low-friction ceramic according to claim 1, wherein said iron oxides initially added as starting material is $Fe_3O_4$.

* * * * *